United States Patent
Bisson et al.

(10) Patent No.: US 7,562,077 B2
(45) Date of Patent: Jul. 14, 2009

(54) METHOD AND APPARATUS FOR GENERATING AND DESCRIBING BLOCK-LEVEL DIFFERENCE INFORMATION ABOUT TWO SNAPSHOTS

(75) Inventors: Timothy C. Bisson, Fremont, CA (US); Stephen L. Manley, Pleasanton, CA (US); Ling Zheng, Sunnyvale, CA (US)

(73) Assignee: NetApp, Inc., Sunnyvale, CA (US)

( * ) Notice: Subject to any disclaimer, the term of this patent is extended or adjusted under 35 U.S.C. 154(b) by 301 days.

(21) Appl. No.: 11/093,074

(22) Filed: Mar. 28, 2005

(65) Prior Publication Data

US 2006/0218135 A1 Sep. 28, 2006

(51) Int. Cl.
*G06F 17/30* (2006.01)
*G06F 7/00* (2006.01)

(52) U.S. Cl. .............................. 707/4; 707/202; 707/203
(58) Field of Classification Search ...................... 707/4
See application file for complete search history.

(56) References Cited

U.S. PATENT DOCUMENTS

| | | | | |
|---|---|---|---|---|
| 5,958,008 A * | 9/1999 | Pogrebisky et al. | ......... | 709/223 |
| 6,131,118 A * | 10/2000 | Stupek et al. | ............... | 709/223 |
| 6,138,157 A * | 10/2000 | Welter et al. | ................ | 709/224 |
| 6,219,053 B1 | 4/2001 | Tachibana et al. | ........... | 715/835 |
| 6,314,463 B1 * | 11/2001 | Abbott et al. | ............... | 709/224 |
| 6,505,245 B1 * | 1/2003 | North et al. | .................. | 709/223 |
| 6,725,268 B1 * | 4/2004 | Jackel et al. | ................ | 709/227 |
| 6,748,504 B2 * | 6/2004 | Sawdon et al. | .............. | 711/162 |
| 6,928,526 B1 | 8/2005 | Zhu et al. | | |
| 6,970,887 B1 * | 11/2005 | Brigham et al. | ........... | 707/104.1 |
| 7,043,503 B2 * | 5/2006 | Haskin et al. | ................ | 707/200 |
| 7,065,619 B1 | 6/2006 | Zhu et al. | | |
| 7,085,785 B2 * | 8/2006 | Sawdon et al. | ............... | 707/204 |
| 7,111,014 B2 * | 9/2006 | Sawdon et al. | .............. | 707/102 |
| 7,111,021 B1 * | 9/2006 | Lewis et al. | .................. | 707/202 |
| 7,346,623 B2 * | 3/2008 | Prahlad et al. | .............. | 707/102 |
| 2002/0116395 A1 * | 8/2002 | Christensen | ............. | 707/104.1 |
| 2002/0143733 A1 * | 10/2002 | Mukkamalla et al. | ........... | 707/1 |
| 2003/0050915 A1 * | 3/2003 | Allemang et al. | ............... | 707/1 |
| 2003/0182313 A1 | 9/2003 | Federwisch et al. | | |
| 2003/0182322 A1 * | 9/2003 | Manley et al. | ............... | 707/201 |
| 2004/0125103 A1 * | 7/2004 | Kaufman et al. | ............ | 345/419 |
| 2004/0210578 A1 * | 10/2004 | Taitel | ............................ | 707/8 |
| 2005/0004954 A1 * | 1/2005 | Soule | ......................... | 707/203 |
| 2005/0033748 A1 * | 2/2005 | Kazar et al. | .................... | 707/10 |
| 2005/0267906 A1 * | 12/2005 | Brigham et al. | ............. | 707/100 |
| 2006/0004725 A1 * | 1/2006 | Abraido-Fandino | ............ | 707/3 |
| 2006/0080270 A1 * | 4/2006 | Mori | ................................ | 707/1 |
| 2006/0235900 A1 * | 10/2006 | Anonsen | ...................... | 707/200 |

* cited by examiner

*Primary Examiner*—Kuen S Lu
*Assistant Examiner*—Mohammad S Rostami
(74) *Attorney, Agent, or Firm*—Perkins Coie LLP

(57) ABSTRACT

An apparatus to compare two datasets, each of which includes multiple data blocks, includes a comparison unit and a report generator. The comparison unit identifies block-level differences therebetween, by comparing block-level metadata between the first and second datasets, without comparing the contents of the data blocks. The report generator generates a human-readable report of the differences between the first and second version of the dataset, including the differences in individual data blocks between the first and second version of the dataset.

20 Claims, 11 Drawing Sheets

METHOD AND APPARATUS FOR GENERATING AND DESCRIBING BLOCK-LEVEL DIFFERENCE INFORMATION ABOUT TWO SNAPSHOTS

CROSS-REFERENCE TO RELATED APPLICATIONS

This application is related to:

U.S. patent application Ser. No. 10/954,381 of S. Manley et al., filed on Sep. 29, 2004 and entitled, "Method and Apparatus for Generating User-Level Difference Information about Two Data Sets";

U.S. patent application Ser. No. 10/100,967 of M. Federwisch et al., filed on Mar. 19, 2002 and entitled, "System and Method for Determining Changes in Two Snapshots and for Transmitting Changes to Destination Snapshot"; and U.S. patent application Ser. No. 10/776,057 of D. Ting et al., filed on Feb. 11, 2004 and entitled, "System and Method for Comparing Data Sets";

all of which are assigned to the assignee of the present application.

FIELD OF THE INVENTION

At least one embodiment of the present invention pertains to storage systems, and more particularly, to a method and apparatus to generate block-level information about the differences between two data sets, such as snapshots.

BACKGROUND

There has long been a demand for the ability to describe the differences between two data sets. The value of such an ability crosses applications. Data backup, Storage Resource Management (SRM), mirroring, and search & indexing are just some of the applications that may need to efficiently discover and describe the differences between data sets.

Classic backup technologies can describe the changes in a data set, including renames, deletes, creates, and modification of particular elements. However, their methods for finding the changes between the systems are extremely slow. They "walk" (traverse) the entire file system in a breadth-first or depth-first manner, taking advantage of none of the optimized data set differencing tools that internal replication tools can utilize. To reduce backup media consumption and system load, backup applications sometimes run differential or incremental backups, in which they attempt to capture only the data that has changed from the previous backup. However, these differential or incremental backups tend not to run significantly faster than the full-system backup, because discovering and describing the changes takes so long.

SRM tools attempt to capture information about the locus of activity on a system. As with backup applications, finding out what parts of the system are active (usually done by determining what is modified) is extremely slow.

Mirrors have difficulty in resolving changes to both sides of a mirror. In mirroring, the data residing between mirrored systems can diverge when both sides of the mirror can be written. Asynchronous mirrors never have a completely current version of the source data. If the source becomes inaccessible and the mirror is brought online for user modification, each half of the mirror will contain unique data. The same can happen to a synchronous mirror, if both sides are erroneously made modifiable. In either case, to resolve the differences between the divergent mirrors will require discovering and describing those differences to the user.

To date, technologists have separated the problems of discovering and describing the changes between two datasets. For example, mirroring applications tend to be extremely efficient at discovering and replicating the changes between versions of a dataset. However, they are incapable of describing those changes at a level that is useful to a human user or another independent application. For example, they can tell a user which blocks of which disks have been changed, but they cannot correlate that information to the actual path and file names (e.g., "My Documents\2003\taxes\Schwab Statements\July"), i.e., "user-level" information.

Another technique, which is described in co-pending U.S. patent application Ser. No. 10/776,057 of D. Ting et al., filed on Feb. 11, 2004 and entitled, "System and Method for Comparing Data Sets" ("the Ting technique"), can print out the names of files that are different between two data sets. However, the Ting technique does not attempt to describe a potential relationship between those differences. For example, a file may have been renamed from patent.doc to patent_V1.doc. The Ting technique would claim that one data set had a file named patent.doc and the other has a file named patent_V1.doc; however, it would not look more deeply into the problem and declare that patent.doc had been renamed to patent_V1.doc. Understanding the relationships between the differences is a critical aspect of the overall problem. Moreover, the method of describing the changes in the Ting technique is relatively expensive and slow. The Ting technique was designed with the assumption that the differences will be very few, and that processing effort should therefore be expended in quickly verifying the similarities between the two data sets. This assumption does not often hold true in certain applications.

What is needed, therefore, is a technique to quickly and efficiently generate user-level information about the differences between two data sets.

SUMMARY OF THE INVENTION

The present invention includes an apparatus which comprises a comparison unit and a report generator. The comparison unit compares a first dataset and a second dataset, the first and second datasets each including a plurality of data blocks, to identify block-level differences therebetween, by comparing block-level metadata between the first and second datasets without comparing the contents of the data blocks. The report generator generates a report of the differences between the first and second version of the dataset, including the differences in individual data blocks between the first and second version of the dataset.

Another aspect of the invention is a method which comprises comparing a first dataset and a second dataset to identify differences therebetween, where the first and second datasets each include multiple data blocks. For each of a plurality of pairs of corresponding data blocks, where each pair includes a first data block in the first dataset and a corresponding second data block in the second dataset, the method determines that the first data block is identical to the second data block if a pointer to the first data block in the first dataset is identical to a pointer to the second data block in the second dataset. The method determines that the first data block is different from the second data block if the pointer to the first data block is different from the pointer to the second data block.

Other aspects of the invention will be apparent from the accompanying figures and from the detailed description which follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A method and apparatus for generating human-readable, block-level difference information about two datasets are described. The technique introduced herein includes an efficient way of identifying changes in metadata associated with two datasets, to locate changed files and characterize the differences between the two datasets. In certain embodiments of the invention, the two datasets may be snapshots of a file system (or a subset thereof) acquired at different points in time. The comparison identifies differences in individual data blocks between the two datasets, by comparing corresponding pointers between the two datasets. The technique does not require moving or copying of either version in the process. A human-readable report of the differences between the two datasets is then generated, where the report indicates the differences in individual data blocks. Note that in this description, the terms "differences" and "changes" and variations of these terms are used interchangeably, to facilitate description.

Figure 1:
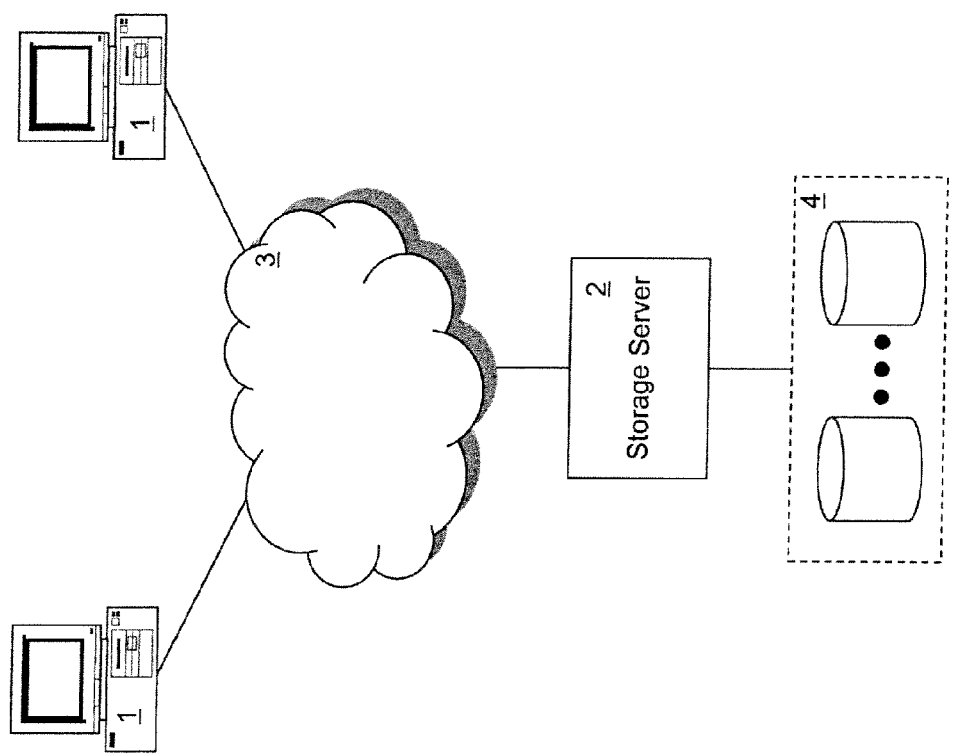
FIG. 1 illustrates a network environment which includes a storage server that serves multiple clients on a network.

Before considering the technique in greater detail, it is useful to consider an environment in which the technique can be implemented. FIG. 1 shows a simple example of such an environment. In FIG. 1, a storage server 2 is coupled locally to a storage subsystem 4 which includes multiple mass storage devices, and to a set of clients 1 through a network 3, such as a local area network (LAN). Each of the clients 1 may be, for example, a conventional personal computer (PC), workstation, or the like. The storage subsystem 4 is managed by the storage server 2. The storage server 2 receives and responds to various read and write requests from the clients 1, directed to data stored in or to be stored in the storage subsystem 4. The mass storage devices in the storage subsystem 4 may be, for example, conventional magnetic disks, optical disks such as CD-ROM or DVD based storage, magneto-optical (MO) storage, or any other type of non-volatile storage devices suitable for storing large quantities of data. The storage devices in storage subsystem 4 can be organized as a Redundant Array of Inexpensive Disks (RAID), in which case the storage server 2 accesses the storage subsystem 4 using one or more well-known RAID protocols.

The storage server 2 may be a file server used in a network attached storage (NAS) mode (otherwise referred to as a "filer"), as is henceforth assumed in this description. The technique introduced herein can be implemented in the storage server 2, or in other devices, as described below. For example, the technique can be adapted for use in other types of storage systems, such as storage servers which provide clients with block-level access to stored data or processing systems other than storage servers, etc. Note that the storage server 2 may have a distributed architecture, even though it is not illustrated as such in FIG. 1.

Figure 2:
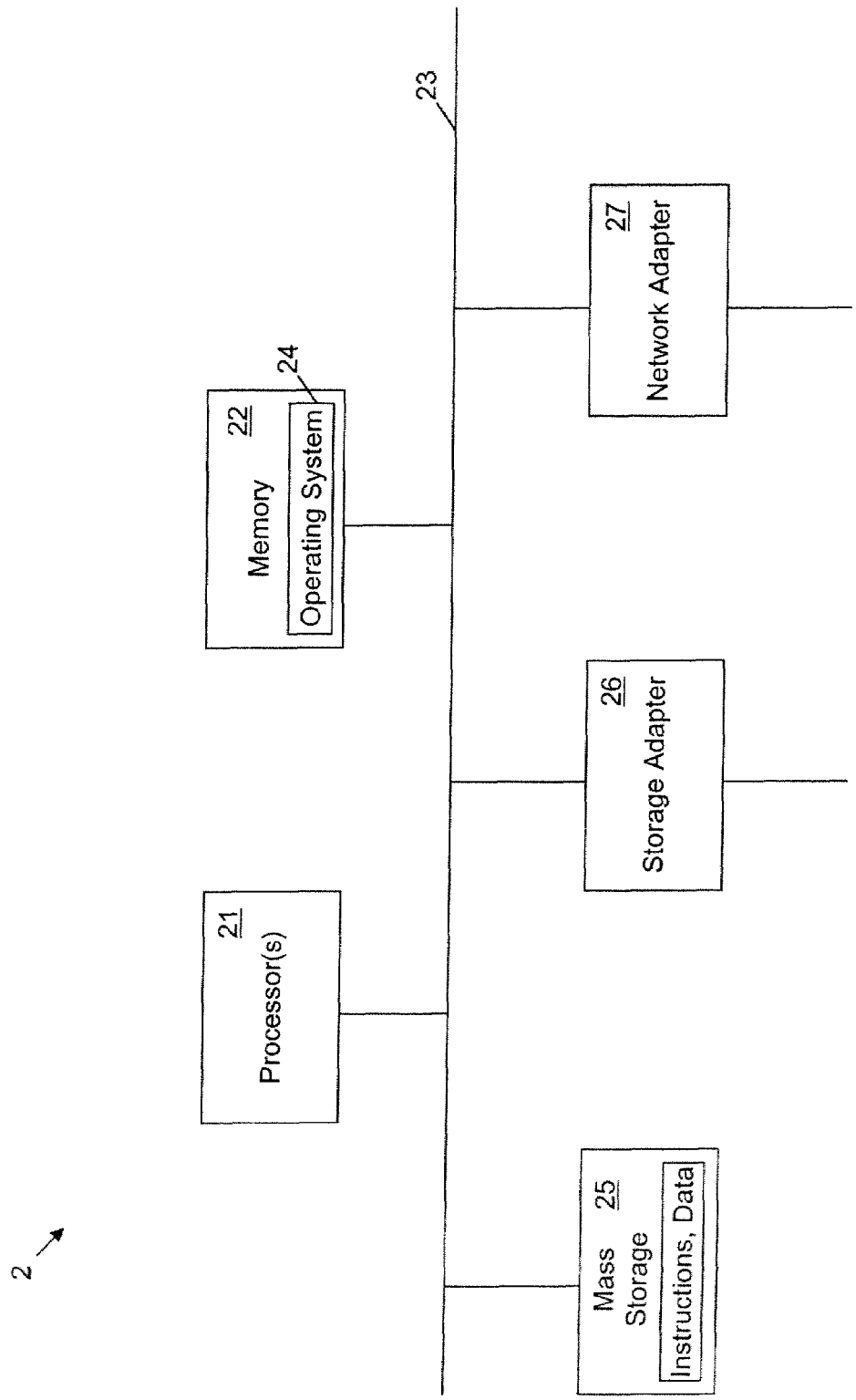
FIG. 2 is a high-level block diagram showing of the storage server.

FIG. 2 is a block diagram showing an example of the architecture of the storage server 2, at a high level. Certain standard and well-known components which are not germane to the present invention are not shown. The storage server 2 includes one or more processors 21 and memory 22 coupled to a bus system 23. The bus system 23 shown in FIG. 2 is an abstraction that represents any one or more separate physical buses and/or point-to-point connections, connected by appropriate bridges, adapters and/or controllers. The bus system 23, therefore, may include, for example, a system bus, a Peripheral Component Interconnect (PCI) bus, a Hyper-Transport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 21 are the central processing units (CPUs) of the storage server 2 and, thus, control its overall operation. In certain embodiments, the processors 21 accomplish this by executing software stored in memory 22. A processor 21 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 22 includes the main memory of the storage server 2. Memory 22 represents any form of random access memory (RAM), read-only memory (ROM), flash memory, or the like, or a combination of such devices. Memory 22 stores (among other things) the storage server's operating system 24, which can implement the technique introduced herein.

Also connected to the processors 21 through the bus system 23 are one or more internal mass storage devices 25, a storage adapter 26 and a network adapter 27. Internal mass storage devices 25 may be or include any conventional medium for storing large volumes of data in a non-volatile manner, such as one or more magnetic or optical based disks. The storage adapter 26 allows the storage server 2 to access the storage subsystem 4 and may be, for example, a Fibre Channel adapter or a SCSI adapter. The network adapter 27 provides the storage server 2 with the ability to communicate with remote devices, such as the clients 1, over a network and may be, for example, an Ethernet adapter, a Fibre Channel adapter, or the like.

Figure 3:
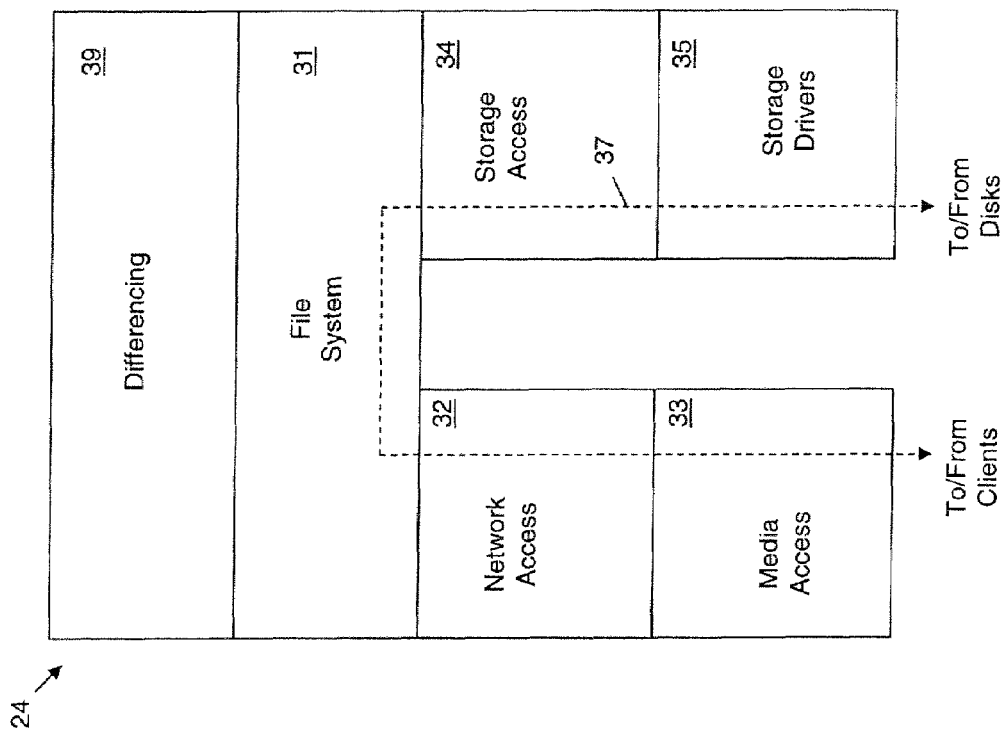
FIG. 3 is a high-level block diagram showing an example of the operating system of the storage server.

FIG. 3 shows an example of the architecture of the operating system 24 of the storage server 2. As shown, the operating system 24 includes several software modules, or "layers". These layers include a file system 31. The file system 31 is application-layer software that imposes a structure (hierarchy) on the data stored in the storage subsystem 4 and services read/write requests from clients 1. Logically "under" the file system 31, the operating system 24 also includes a network access layer 32 and an associated media access layer 33, to allow the storage server 2 to communicate over the network 3 (e.g., with clients 1). The network access 32 layer implements one or more of various higher-level network protocols, such as Network File System (NFS), Common Internet File System (CIFS), Hypertext Transfer Protocol (HTTP) and/or Transmission Control Protocol/Internet Protocol (TCP/IP). The media access layer 33 includes one or more drivers which implement one or more lower-level protocols to communicate over the network, such as Ethernet, Fibre Channel or Internet small computer system interface (iSCSI).

Also logically under the file system 31, the operating system 24 includes a storage access layer 34 and an associated storage driver layer 35, to allow the storage server 2 to communicate with the storage subsystem 4. The storage access layer 34 implements a higher-level disk storage protocol, such as RAID, while the storage driver layer 35 implements a lower-level storage device access protocol, such as Fibre Channel Protocol (FCP) or small computer system interface (SCSI). Also shown in FIG. 3 is the path 37 of data flow, through the operating system 24, associated with a read or write operation.

The operating system 24 also includes a differencing layer 39 logically on top of the file system 31. The differencing layer 39 is an application layer which implements the technique introduced herein, to generate user-level difference information about two datasets to a file and/or a display device. Note, however, that the technique introduced herein does not have to be implemented in the storage server 2, i.e., it could alternatively be implemented in a separate system to which the datasets are provided as input.

To facilitate description, it is assumed that the storage server 2 is capable of acquiring "snapshots", at different points in time, of all of the data which it stores (e.g., the files and directories), or specified subsets thereof. A "snapshot" is a persistent image of the exact state of the data maintained by the storage server 2 (or a designated subset thereof) at a given point in time, from which that state can be restored if necessary (e.g., in the event of a catastrophic loss of data). Further details about snapshots are discussed below.

It is further assumed for purposes of description that the storage server 2, when writing modified data to disk, does not write the modified data blocks "in place". Rather, whenever a block of data is modified, the block is written to a new physical location on disk; this property is referred to as "write anywhere".

To facilitate description, it is further assumed that the two datasets which are to be compared are two different snapshots of a volume of data stored by the storage server 2. Noted, however, that the technique introduced herein can be used to compare and characterize the differences between datasets other than snapshots or different versions of a given set of data.

Figure 4:
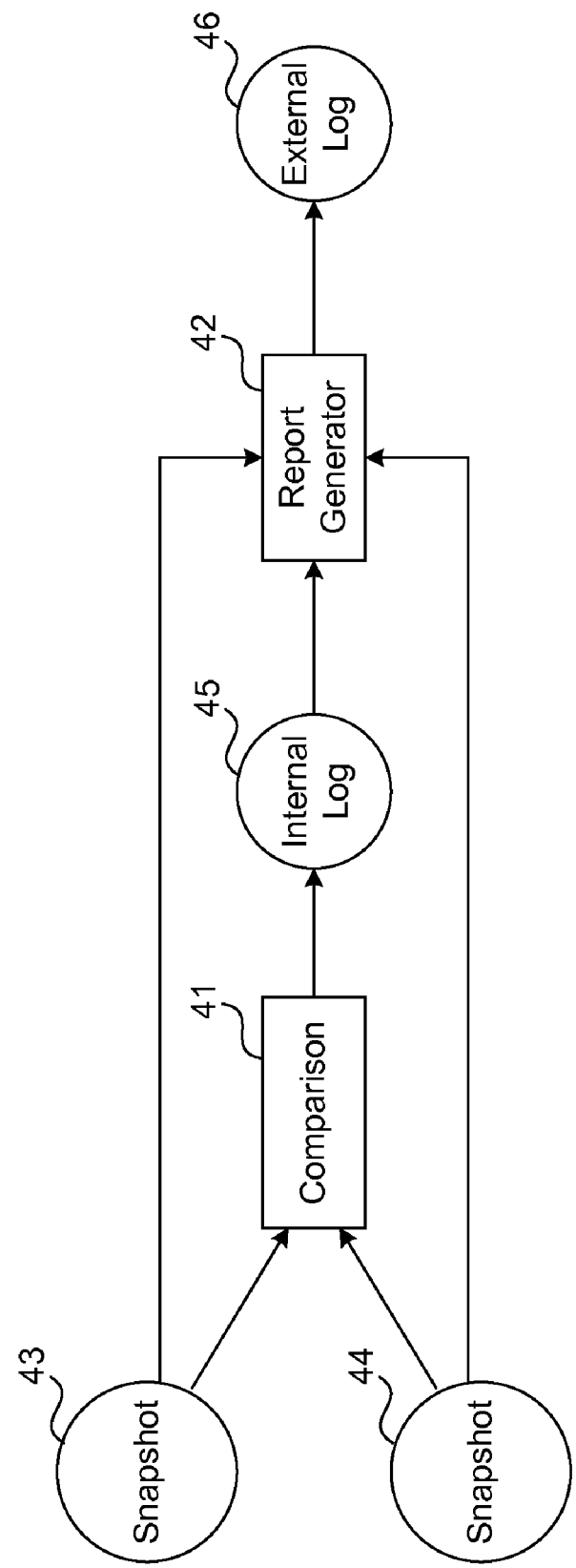
FIG. 4 illustrates the relevant functional elements of the differencing layer of the operating system 24, according to certain embodiments of the invention.

FIG. 4 illustrates the relevant functional elements of the differencing layer of the operating system 24, according to certain embodiments of the invention. The differencing layer 39 includes a comparison unit 41 and a report generator 42. The comparison unit 41 receives as input two snapshots 43 and 44 of a volume of data maintained by the storage server 2, acquired at two different points in time. The comparison unit 41 processes the snapshots 43 and 44 progressively to identify the differences between them and, based on the differences, generates an internal log file 45. What is meant by "internal" is that the log file 45 is not necessarily in human-readable form. After the internal log file 45 is generated, the report generator 42 processes the two snapshots 43 and 44 to determine the full pathnames associated with any changed files and directories, and uses the internal log file 45 to identify the specific changes down to the block level. In other words, the report generator 42 can determine which specific blocks in any particular file have been modified. The report generator 42 then uses these inputs to generate a report of the changes, i.e., an external log file 46, where "external" means the log file 46 is in human-readable form. The processes performed by the comparison unit 41 and the report generator 42 are described further below.

In certain embodiments of the invention, the comparison unit 41 and report generator 42 are embodied as software modules within the differencing layer 39 of the operating system 24. In other embodiments, however, the functionality provided by these units can be implemented, at least in part, by one or more dedicated hardware circuits.

Figure 5:
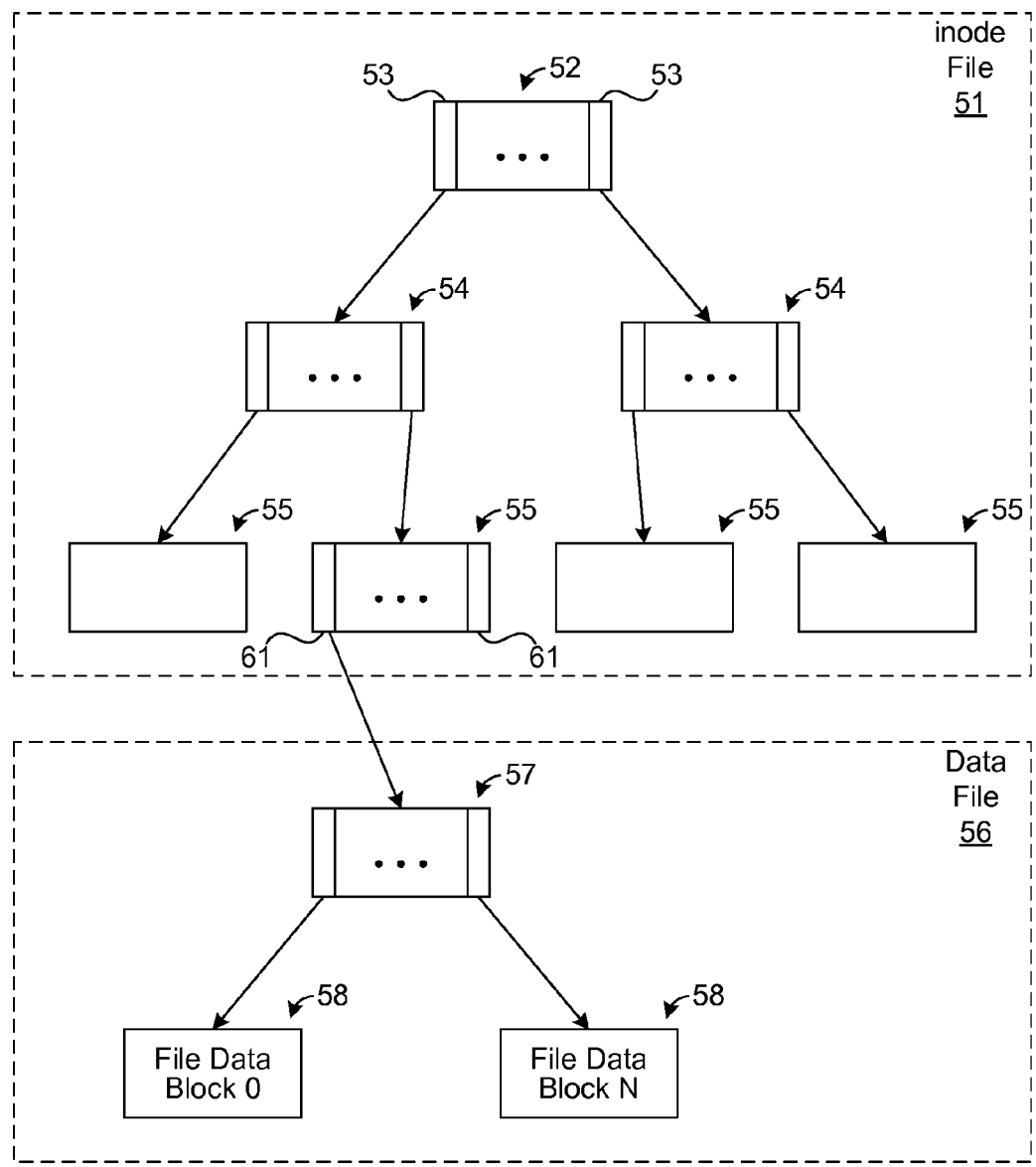
FIG. 5 illustrates an example of the structure of a snapshot.

FIG. 5 illustrates an example of the structure of a snapshot, according to certain embodiments of the invention. As mentioned above, a snapshot may correspond to a specified subset of the data maintained by the storage server, i.e., a "volume" of data. A volume may include data stored on one or more physical storage devices. Associated with each file in a volume is a set of metadata for that file, such as a pointer to the file, the file size, the number of blocks included in the file, permissions, etc. The set of metadata is stored in a unit of storage called an "inode". Each file in a volume has a separate inode which contains the file's metadata.

All of the inodes for a given volume are stored in an inode file, as illustrated in FIG. 5. The inode file 51 has a hierarchical structure, at the top of which is a root node 52. The root node 52 and all other nodes in the inode file 51 each have a predetermined number of storage units 53. Each storage unit 53 contains a pointer to another node. Each node referenced by a pointer in the root node 52 is referred to herein as an "indirect block". Each indirect block 54 includes a number of storage units 53, each of which contains a pointer to another node in the inode file 51, known as a "direct block". Each direct block 55 in the inode file 51 includes a number of storage units 61, which are the inodes of the files in this volume. As indicated above, each inode 61 includes a pointer to the corresponding data file, such as data file 56, as well as other metadata relating to the data file.

As shown in FIG. 5, a data file 56 also is in the form of a hierarchical (tree) structure. In the illustrated embodiment, the data file 56 comprises a root node 57 and one or more direct data blocks 58. The root node 57 of the data file 56 includes a number of storage units 53, each of which contains a pointer to a separate one of the direct data blocks 58. Each of the direct data blocks 58 contains a portion of the actual data of the data file.

Note that the example of FIG. 5 is a simplified example; an actual snapshot of a volume is likely to be considerably larger and more complex. For example, rather than just having one level of indirect blocks 54 in the inode file 51, the inode file 51 could include two or more levels of indirect blocks between the root node 52 and the direct blocks 55. Similarly, the data file 56 could include one or more levels of indirect blocks between its root node 57 and the direct data blocks 58.

Figure 6:
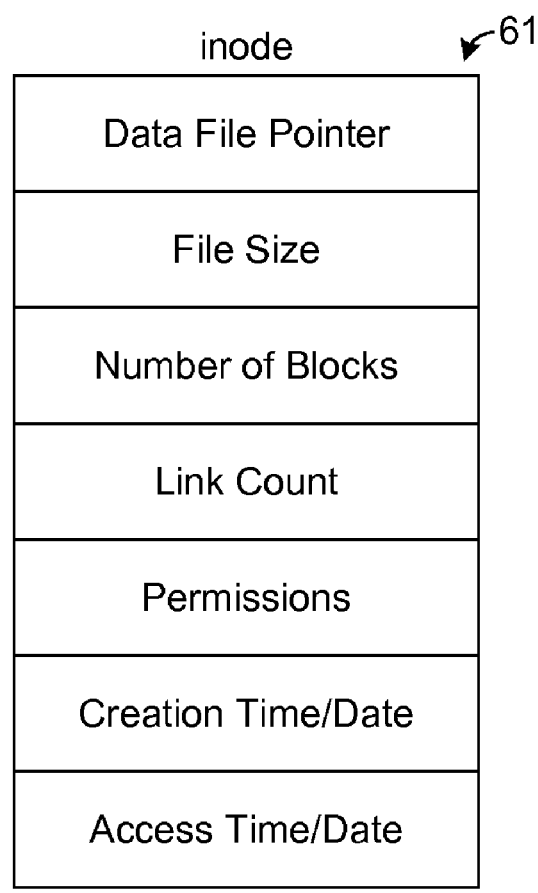
FIG. 6 illustrates an example of the contents of an inode.

FIG. 6 illustrates an example of the contents of an inode 61. The main purpose of an inode 61 is to store metadata about a particular data file, including a pointer to the tree structure of the data file, the size (in kBytes) of the data file, the number of blocks in the data file, the link count (number of references to that data file in the volume), permissions associated with the data file, access time, creation time/date. An inode 61 may also include other metadata not mentioned here.

The technique introduced herein takes advantage of the "write anywhere" property of the storage server 2 to quickly and efficiently identify the changes between two versions of a dataset. As a result of the write anywhere property, whenever an actual data block in a file is modified, added, deleted, or renamed, at least some of the metadata in that file's inode 61 will necessarily change. Therefore, by comparing the contents of an inode 61 in one snapshot with the contents of the corresponding inode in another snapshot, it is possible to determine whether the associated file changed from one snapshot to the other. If the contents of the two corresponding inodes 61 are different, the file has changed. If the inode contents are identical, the file has not changed.

Further, as a result of the "write anywhere" property, any time the contents of an inode or a direct data block change, all of the pointers which point to that inode (either directly or indirectly, starting from the root node) will also necessarily change. Therefore, referring again to FIG. 5 for example, by progressively comparing corresponding pointers in the inode file 51 between two snapshots, starting from the root node 52 and working downward in a depth-first manner, it is possible to quickly identify and eliminate branches of the inode file tree which have not changed, and therefore, to quickly identify the inodes 61 that have changed. More specifically, if any two corresponding pointers are found to be identical between two snapshots, then all of the inodes 61 which descend from those pointers (and any indirect blocks which descend from them) must also be identical, such that there is no need to compare any of those descendants between the snapshots. If two corresponding pointers are found not to be identical, the process moves down the inode file tree one level and continues the comparison process, skipping any branches of the tree that must be identical, until the changed inodes are identified.

Once a modified file has been identified be identifying a changed inode, the same technique can be used to identify the individual data blocks of the file that are different between the two snapshots, i.e., by comparing corresponding pointers in the data file 56 between the two snapshots (see FIG. 5). This approach allows modified (or added or deleted) blocks to be identified without having to examine the actual contents of those blocks.

Figure 7:
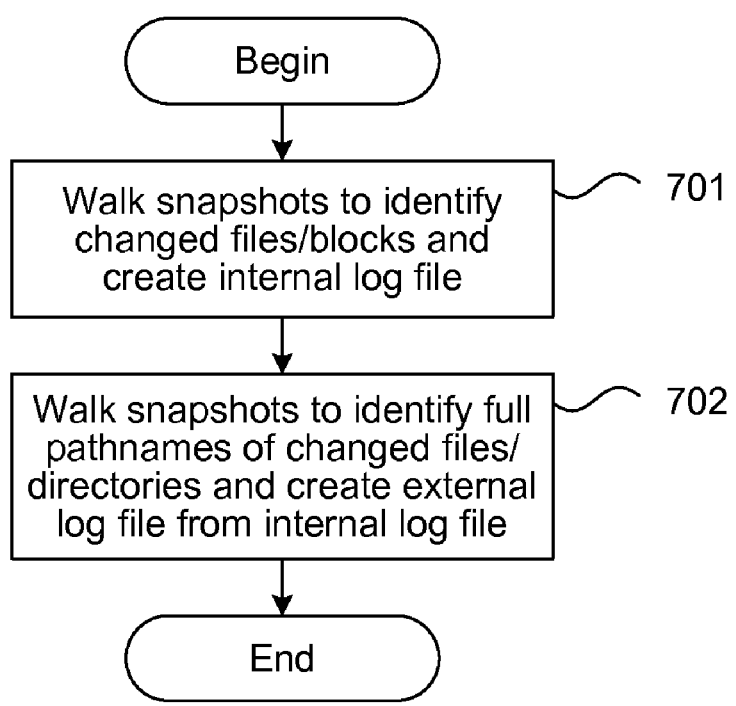
FIG. 7 illustrates the overall process of a snapshot differencing technique.

FIG. 7 illustrates the overall process performed by the technique. The process may be triggered by a user command or it may be triggered automatically, such as that predetermined times or intervals or in response to a specified event. At a high-level, the process is a two-phase process. In the first phase 701, the process "walks" (progressively examines) the two snapshots to be compared, to identify the changed files and blocks and to store information regarding the changes in the internal log file 45. In the second phase 702, the process again walks the two snapshots (or more precisely, the relevant branches) to identify the full pathnames of any changed files or directories and to create the external log file 46.

Figure 8:
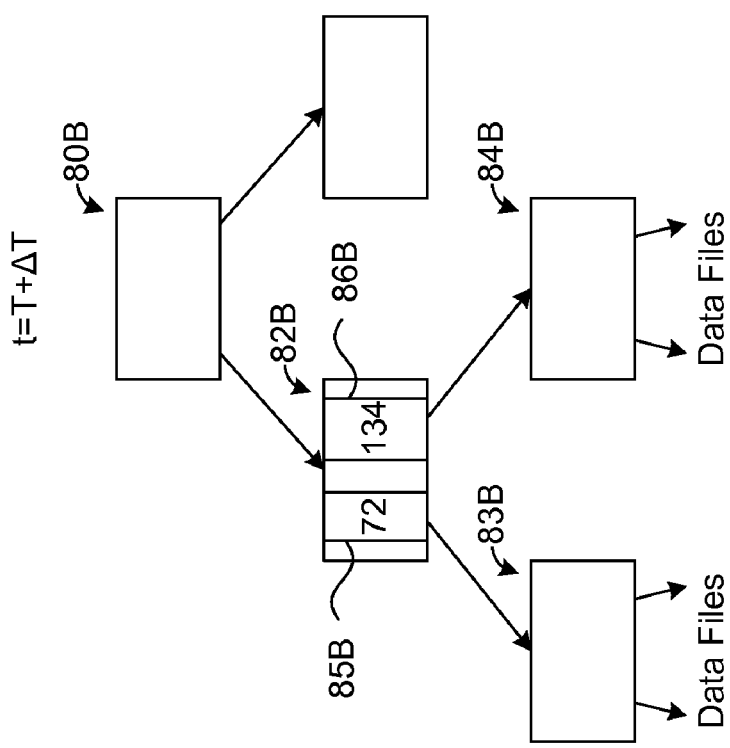
FIG. 8 shows an example of two simple snapshots of a volume, acquired at different points in time.
Figure 8:
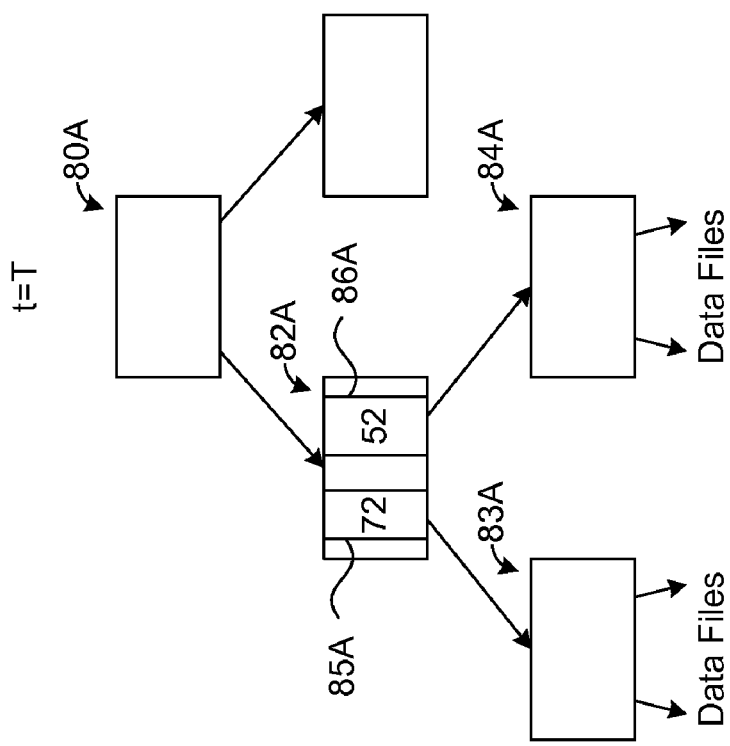

Refer now to FIG. 8, which shows an example of two simple snapshots 80A and 80B of a volume, which can be compared using the technique introduced herein. Again, it is assumed that the snapshots were acquired in a file system that adheres to the "write anywhere" approach mentioned above when writing modified data, i.e., it does not write "in place". Again, an actual snapshot of a volume is likely to be considerably more complex than snapshots 80A and 80B in FIG. 8, although the general approach described here would still apply. Assume snapshot 80A was acquired (saved) at a time t=T, while snapshot 80B was acquired at a time t=T+ΔT. For simplicity, the underlying data files are not shown; only the inode file of each snapshot is shown.

Snapshots 80A and 80B each include two indirect blocks. Each storage unit in each indirect block contains a pointer to a direct block in the inode file; these pointers are referred to as physical volume block numbers (PVBNs), since they indicate the physical locations on disk of the referenced direct blocks. In the earlier snapshot, snapshot 80A, indirect block 82A includes a PVBN 85A, which has a value of 72, pointing to a direct (inode) block 83A, and another PVBN 86A, which has a value of 52, pointing to another direct (inode) block 84A.

The later snapshot, snapshot 80B, includes an indirect block 82B which corresponds to indirect block 82A in snapshot 80A. Indirect block 82B includes a PVBN 85B, which has a value of 72, pointing to a direct (inode) block 83A, and another PVBN 86B, which has a value of 134, pointing to another direct (inode) block 84B. Given that the system uses write anywhere (not write in place), since PVBNs 85A and 85B (in snapshots 80A and 80B, respectively) both have a value of 72, the direct blocks 83A and 83B (referenced by PVBNs 85A and 85B respectively) must also be identical, i.e., have not changed from snapshot 80A to snapshot 80B. Therefore, all of the corresponding actual data blocks referenced (directly or indirectly) under direct blocks 83A and 83B must also be the same between the two snapshots.

Figure 9:
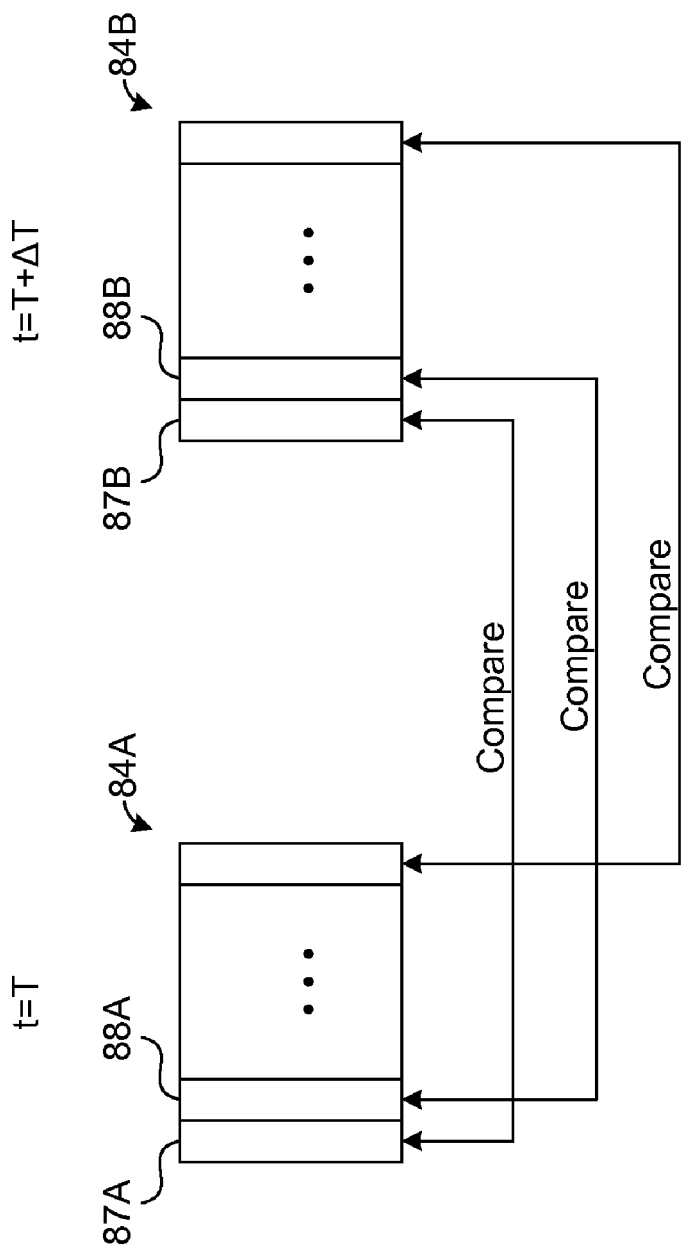
FIG. 9 shows a technique of comparing corresponding pairs of inodes between two snapshots.

On the other hand, corresponding PVBNs 86A and 86B are not identical, because PVBN 86A has a value of 52 while PVBN 86B has a value of 134. This means that at least one inode in direct block 84B in snapshot 80B is different from the corresponding inode in direct block 84A in snapshot 80A. Therefore, to identify the changed inodes, it is necessary to follow these pointers down to the next level of the inode file tree and to compare the corresponding inodes between direct blocks 84A and 84B. Referring to FIG. 9, for example, inode direct block 84A from snapshot 80A may include a number of inodes 87A, 88A, etc., while inode direct block 84B from snapshot 80B includes a number of corresponding inodes 87B, 88B, etc. The comparison at this level, therefore, would involve comparing inode 87A with inode 87B, comparing inode 88A with inode 88B, etc., to determine which inodes have changed between the two snapshots. Once the changed inodes are identified, the same approach is applied to the changed data files to identify the individual data blocks that have changed.

Figure 10A:
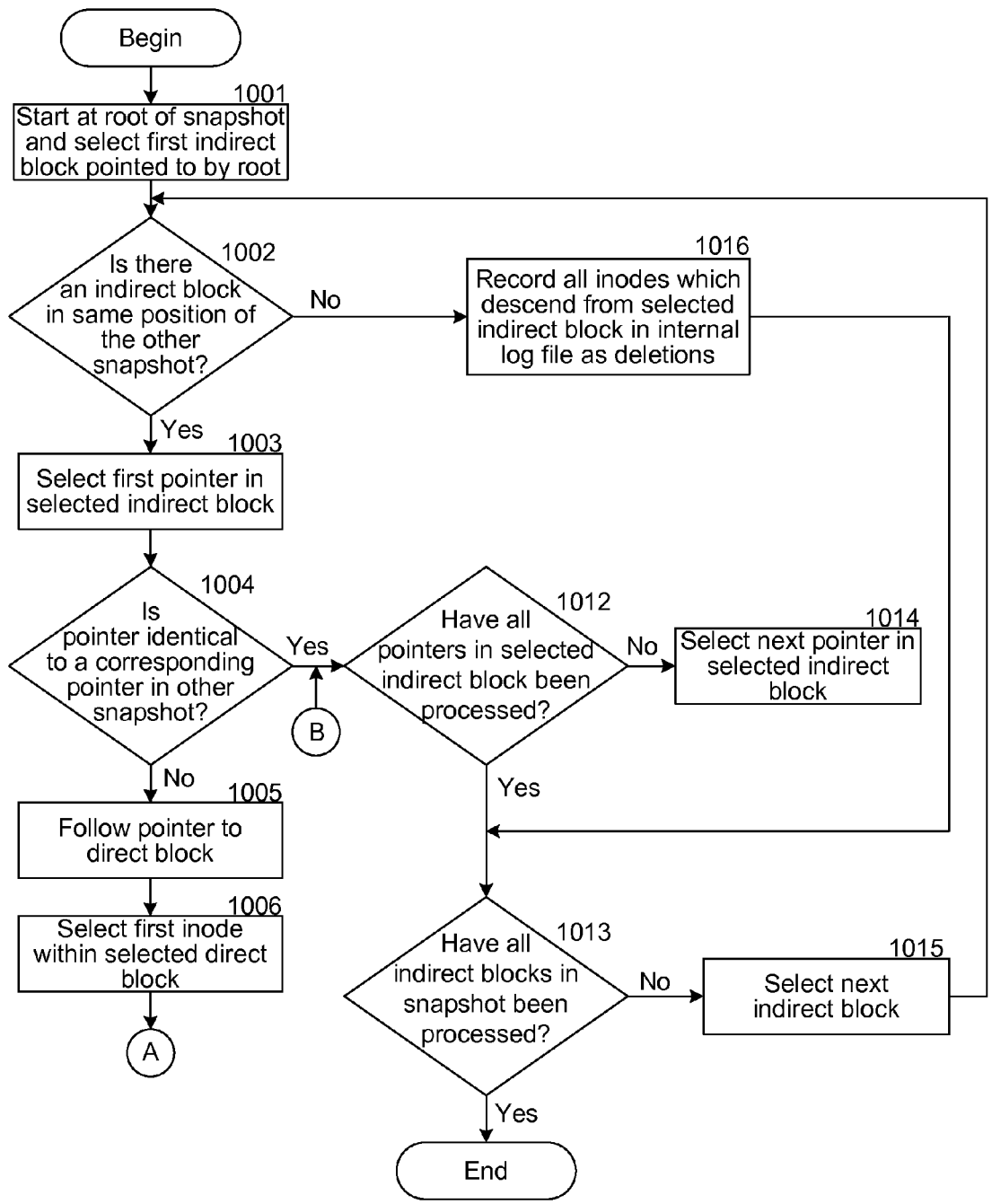
FIGS. 10A and 10B collectively form a flow diagram showing the process of comparing snapshots and generating the internal log file, according to certain embodiments of the invention.
Figure 10B:
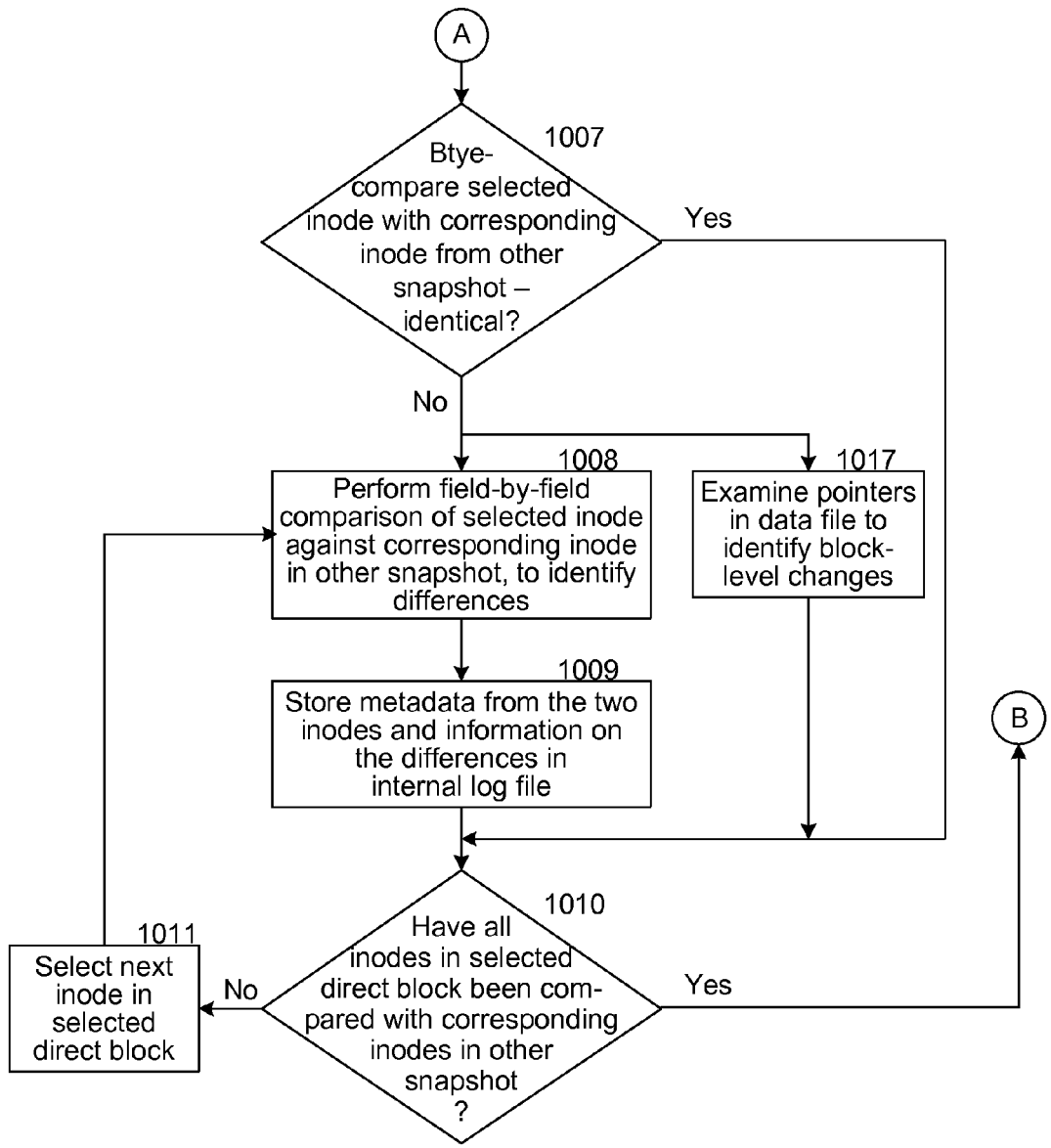

The first phase of the overall process (block 701 in FIG. 7), i.e., the process of comparing snapshots and generating the internal log file, will now be described in further detail with reference to FIGS. 10A and 10B. To facilitate description, the snapshot which forms the basis of the comparison in the following process shall be referred to as the "base snapshot" while the other snapshot shall be referred to as the "delta snapshot". Note, however, that the "base snapshot" is not necessarily the earlier snapshot; the later snapshot can be the "base snapshot" and the earlier snapshot can be the "delta snapshot" in the process of FIGS. 10A and 10B.

Due to possible additions or deletions of data blocks between the two snapshots, there may be some indirect blocks and direct blocks which appear in one snapshot but not the other. Therefore, in one embodiment of the invention, after the following process is executed using one snapshot as the base snapshot, it is repeated using the other snapshot as the comparison basis, but without re-examining any portions of the tree that were already examined. In this way, all branches of both snapshots will be considered, in an efficient manner. Alternatively, the foregoing process can be performed in parallel on both snapshots.

Initially, at 1001 the process starts at the root node of both snapshots and selects the first indirect block pointed to by the root node in the base snapshot. If there is an indirect block in the same position of the delta snapshot (1002), then the process proceeds to 1003. If there is no corresponding indirect block in the delta snapshot, assuming the base snapshot is the earlier snapshot, this means that all inodes which descend from the selected indirect block were deleted after the base snapshot was acquired. In that case, the process proceeds to 1016, in which all inodes which descend from the selected indirect block are recorded in the internal log 45 file as deletions (note that if 1002 was performed while using the later snapshot as the base snapshot, a negative outcome of 1002 would indicate that all of the descendent inodes were added after the base snapshot was acquired, and the internal log file 45 would be updated accordingly). After 1016, the process proceeds to 1013, described below.

At 1003 (i.e., when there is a corresponding indirect block in the delta snapshot), the process selects the first pointer (first PVBN) in the currently selected indirect block in the base snapshot. Next, at 1004 process determines whether the value of the selected pointer is identical to the value of the corresponding pointer (PVBN) in the delta snapshot (i.e., the pointer in the same position of the corresponding indirect block in the delta snapshot). If the pointers are identical, the process proceeds to determine at 1012 whether all of the pointers in the selected indirect block have been processed. If not all of the pointers in the selected indirect block have been processed, then the process selects the next pointer in the currently selected indirect block at 1014 and then loops back to 1004. If all of the pointers in the selected indirect block have been processed, then the process determines at 1013 whether all indirect blocks in the base snapshot have been processed. If not all of the indirect blocks in the base snapshot have been processed, then the next indirect block is selected at 1015 (using a depth-first approach), and the process then loops back to 1002. If all indirect blocks in the base snapshot have been processed, the process ends.

Referring back to 1004, if the values of the corresponding pointers in the two snapshots are determined not to be identical, then the process proceeds to 1005, in which the selected pointer in the base snapshot is followed down the inode file tree to the corresponding direct block in the inode file. The process then selects the first inode in the selected direct block 1006. Next, at 1007 the process does a byte-by-byte comparison of the selected inode in the base snapshot with the corresponding inode in the delta snapshot to determine if they are identical. The byte comparison allows a quick determination of whether the contents of the corresponding inodes are different and allows a more time-consuming field-by-field comparison to be avoided if they are the same. If the byte comparison indicates the inodes are identical, the process then proceeds to 1010, described below.

If the byte comparison (1007) determines that the corresponding inodes are not identical, this means that the corresponding data files are also not identical. In that event, at 1008 the process performs a field-by-field comparison of the selected inode in the base snapshot against the corresponding inode in the delta snapshot, to identify the specific differences. After identifying the specific differences at 1008, at 1009 the process stores certain metadata from the two inodes and information about the differences in the internal log file, which is described in further detail below.

In addition, if the byte comparison (1007) determines that the corresponding inodes are not identical, the process also then goes on to determine the block-level changes in the underlying data files at 1017, by applying to the data file essentially the same the iterative process of comparing block pointers which was applied to the inode file as described above. The only difference is that once a difference is identified in the pointers (PVBNs) to two direct data blocks between the two snapshots, there is no need to compare the contents of those direct data blocks, in contrast with the inode comparison. It is sufficient to know that the two direct data blocks are different. This subprocess (1017) includes updating the internal log file to reflect, for each inode (i.e., each data file), the block-level differences that are identified.

After storing the relevant information in the internal log file (1009), at 1010 the process determines whether all inodes in the selected direct block have been processed. If all corresponding pairs of inodes in the selected direct blocks have been compared, then the process used back to 1012, described above. Otherwise, the process selects the next inode in the selected direct block in the base snapshot at 1011 and then loops back to 1008, described above.

Some indirect blocks and direct blocks may appear in one snapshot but not the other, due to additions or deletions of data blocks between the two snapshots, as indicated above regarding 1002 and 1016. Therefore, in one embodiment of the invention, after the foregoing process is executed using one snapshot as the base snapshot, it is repeated using the other snapshot as the base snapshot, but without re-examining any portions of the tree that were examined in the prior iteration. Note that if the later snapshot is the base snapshot, step 1016 would instead record the inodes as additions in the internal log file 45, not deletions. In this way, all branches of both snapshots will be considered, in an efficient manner. Alternatively, the foregoing process can be performed in parallel on both snapshots.

In certain embodiments of the invention, the internal log file 45 includes a separate entry for each pair of corresponding inodes that are found to be different between the two snapshots. The internal log file 45 may be implemented in the form of a table, for example, where each entry in the internal log file 45 is a row in the table and represents a separate file. For each entry (i.e., for each changed file), the log file 45 includes:

inode number of the file.
timestamp to indicate the date/time of the relative create/modify.
size of the file for both snapshots.
link count of the file for both snapshots.
number of data blocks in the file for both snapshots.
permissions of the file for both snapshots.
user ID to indicate the owner of the file for both snapshots.
group ID to indicate the group owner of the file for both snapshots. A user belongs to at least one group. When a user creates a file, their initial group is used as the group ID for that file as well as their user ID.
stream inode number to identify the stream inode attached to a file, for both snapshots. This parameter is specific to Windows based file systems. A stream can hold information such as security information or "data". On a Unix based system, the stream inode number for most files will be 0, because streams are not associated with Unix-based files.
xinode number to identify the inode that contains the access control list (ACL) for a file, for both snapshots. Files may share xinodes if their content is the same. On a Unix based system, the xinode number for most files will be 0 for the same reasons as the stream inode number.
a set of bit flags, which can be used for any of various purposes. For example, one or more of the bit flags can be used to indicate the types of changes detected in the inode (e.g., a "ink count changed" bit flag, a "block count changed" bit flag, etc.). The manner in which the specific types of changes are identified is unimportant; any conventional technique for doing so can be used.
the number of blocks shared (in common) by the two snapshots or, conversely, the number of blocks which changed between the two snapshots. Note that the number of common and shared blocks are applicable only for modified files, not for deleted or added files.

Each entry of the internal log file 45 has a known fixed size in memory. To facilitate fast access to the internal log file 45, in certain embodiments of the invention the starting memory location of each entry in the internal log file 45 is chosen as the product of the inode number of that entry and the known fixed size of an entry. Therefore, when reading the internal log file 45 (i.e., to generate the external log file 46), given an inode number the calling process immediately knows the exact location of the corresponding entry in the internal log file 45.

In certain embodiments of the invention, the internal log file 45 is actually implemented as two or more distinct files. For example, there may be an internal log file to record all deletions and a separate internal log file to record all other types of differences (i.e., additions, modifies, renames). This approach is desirable if, for example, inodes can be reused. For example, assume a file "foo1" with inode number 100 is deleted between time T1 and time T2, and another file "foo2" is subsequently created between time T1 and T2 and assigned inode number 100. Without the use of two separate internal log files, as just noted, it would be difficult if not impossible to distinguish this deletion and creation from a modify.

The second and final phase (702 in FIG. 7) of the overall process is to determine the full pathnames of all files for which differences were recorded in the previous phase and, based on the internal log file 45, to generate the external log file 46 (FIG. 4), i.e., a log file in human readable form. By "full pathname", what is meant is the filename and the names of any directories and subdirectories in which the file is located, from the root of the volume to the file itself, in human-readable form. For example, assume a file named "China_exports" is stored in a subdirectory called "world_trade", which is stored in a directory called "economics" in a storage volume named "vol1"; in that case, the full pathname of the file would be /vol1/economics/world_trade/China_exports.

For each file for which a difference was identified between the two snapshots during the first phase 701, the full pathname of the file is determined and recorded in the external log file 46 in the second phase 702, along with information identifying (in human-readable form) the type(s) of difference(s) identified and other metadata from the corresponding internal log file entry 45. For each file, the difference information identifies which specific blocks have changed, added or deleted between the two snapshots. The external log file 46 may have any desired format, such as a table of filenames with their associated path and change information, a list, etc. For example, a typical entry in the external log file 46 might appears as follows:

File "China_exports" modified at blocks 2, 6 and 12; full path=/vol1/economics/world_trade/China_exports The files for which this must be done are identified from the internal log file 45. The bit flags in the internal log file can be used to identify the specific types of changes. The full pathnames can be determined simply by "walking" the snapshot trees starting from the root nodes, and recording the various directories and subdirectories along the path to each changed file. A technique for quickly and efficiently walking a hierarchical data set to identify full pathnames of changed files and directories, which is suitable for this purpose, is described in co-pending U.S. patent application Ser. No. 10/954,381 of S. Manley et al., filed on the Sep. 29, 2004 and entitled, "Method and Apparatus for Generating User-Level Difference Information About Two Data Sets," ("the Manley technique"), which is incorporated herein by reference.

Note that the technique introduced herein does not require copying or moving of either snapshot (or other data set) involved in the comparison.

While the above description assumes that the snapshots to be compared were generated in a "write anywhere" system, that need not be the case. That is, the basic principles introduced above can be used to compare snapshots from a system which uses write-in-place. Assume, for example, that a system capable of generating a snapshot employs write-in-place in conjunction with copy-on-write. Assume more specifically that when the system receives a request to modify a block, the system first copies the contents of the block to a new block, for use in a snapshot, and then modifies the block in place. Hence, the above-described technique of comparing pointers can still be used to identify differences between two snapshots, because a change to a block will still result in the allocation of a new block in a snapshot.

Thus, a method and apparatus for generating human-readable, block-level difference information about two datasets have been described. Note that references throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A processing system comprising:
   a processor;
   a storage facility coupled to the processor and storing a first dataset and a second dataset; and
   a memory coupled to the processor and storing instructions which, when executed by the processor, cause the processing system to perform a process of comparing the first dataset and the second dataset to identify block-level differences therebetween, the first and second datasets each including a plurality of direct blocks containing data and a plurality of indirect blocks, each indirect block containing a plurality of pointers, each pointer pointing to one of the direct blocks or another indirect block, the process including,
   (a) comparing a pointer to a block in the first dataset with a corresponding pointer to a block in the second dataset,
   (b) if the pointer in the first dataset is identical to the corresponding pointer in the second dataset, then determining that all blocks referenced by the pointer, either directly or indirectly, are identical between the first and second datasets;
   (c) if the pointer in the first dataset is different from the corresponding pointer in the second dataset and points to an indirect block, then following the pointer in the first dataset down the hierarchical structure to a pointer to a direct block in the first dataset, and executing said (b) comparing with said pointer to the direct block and a corresponding pointer in the second dataset;

(d) if the pointer in the first dataset is different from the corresponding pointer in the second dataset and points to a direct block, then determining that the direct block in the first dataset is different from the direct block in the second dataset;

(e) identifying full pathnames of a plurality of individual data containers in the first and second dataset for which differences in individual data blocks between the first and second dataset have been identified; and (f) generating a report for output to a human user, indicating the differences in individual data blocks between the first and second datasets in association with the full path names of the individual data containers which contain the individual data blocks.

2. A processing system as recited in claim 1, wherein the first and second datasets each include block-level metadata about corresponding portions of the dataset;

wherein said comparing the first dataset and the second dataset comprises:

identifying differences in the metadata between the first and second datasets.

3. A processing system as recited in claim 1, wherein the first and second datasets are snapshots of a file system at different times.

4. A processing system as recited in claim 1, wherein the processing system comprises a storage server.

5. A processing system as recited in claim 1, wherein the storage server is a storage server.

6. A processing system as recited in claim 1, further comprising:

a storage interface through which to communicate with an array of storage devices for purposes of reading data from, or writing data to, the storage devices; and a network interface through which to communicate with a plurality of clients over a network;

the processing system being configured to service requests from the clients relating to data stored in the array of storage devices.

7. A method of identifying differences between a first dataset and a second dataset in a network storage server, the method comprising:

for each of a plurality of pairs of corresponding data blocks, where each pair includes a first data block in the first dataset and a corresponding second data block in the second dataset, in the network storage server, determining that the first data block is identical to the second data block if a pointer to the first data block in the first dataset is identical to a pointer to the second data block in the second dataset; and determining that the first data block is different from the second data block if the pointer to the first data block is different from the pointer to the second data block;

identifying full pathnames of a plurality of individual data containers in the first and second dataset for which differences in individual data blocks between the first and second dataset have been identified, in the network storage server; and generating a report for output to a human user, of the differences between the first and second datasets in the network storage server, the report indicating differences in individual data blocks between the first and second datasets in association with the full path names of the individual data containers which contain the individual data blocks.

8. A method as recited in claim 7, wherein the first and second datasets each include block-level metadata about corresponding portions of the dataset;

the method further comprising:

identifying differences in the metadata between the first and second datasets.

9. A method as recited in claim 7, wherein each of the first and second version of the dataset has a hierarchical structure.

10. A method as recited in claim 9, wherein the first dataset and the second dataset are snapshots of a given volume of data at two different points in time.

11. A method as recited in claim 7, wherein the dataset comprises a file system, and wherein the first and second versions of the dataset are snapshots of the file system at different times.

12. A method as recited in claim 7, wherein the first and second datasets each include a plurality of direct blocks containing data and a plurality of indirect blocks arranged in a hierarchical structure, each indirect block containing a plurality of pointers, each pointer pointing to one of the direct blocks or another indirect block, and wherein the method comprises:

(a) comparing a pointer to a block in the first dataset with a corresponding pointer to a block in the second dataset, (b) if the pointer in the first dataset is identical to the corresponding pointer in the second dataset, then determining that all blocks referenced by the pointer, either directly or indirectly, are identical between the first and second datasets;

(c) if the pointer in the first dataset is different from the corresponding pointer in the second dataset and points to an indirect block, then following the pointer in the first dataset down the hierarchical structure to a pointer to a direct block in the first dataset, and executing said (b) comparing with said pointer to the direct block and a corresponding pointer in the second dataset; and (d) if the pointer in the first dataset is different from the corresponding pointer in the second dataset and points to a direct block, then determining that the direct block in the first dataset is different from the direct block in the second dataset.

13. A method comprising:

accessing a first version and a second version of a dataset by using a processor in a network storage server, the dataset having a hierarchical structure, wherein the first version and the second version each contain at least one indirect block and a plurality of direct blocks, each indirect block containing a plurality of block pointers, each block pointer identifying one of the direct blocks or another indirect block, each of the direct blocks containing a plurality of information units, each of the information units containing metadata about a corresponding portion of data in the dataset, including metadata about individual blocks of the dataset;

generating an internal log of differences between the first and second version of the dataset, by using the processor in the network storage server, by examining the first and second version of the dataset to identify ones of the information units which are different between the first and second version of the dataset, and recording information about the differences in the internal log, wherein said examining includes comparing pairs of said plurality of block pointers in indirect blocks between the first and second datasets to identify identical blocks in the first and second version of the dataset; and identifying full pathnames of a plurality of individual data containers in the first and second versions of the dataset corresponding to the identified information units, each said full pathname including a filename and a directory name; and generating a human-readable log for output to a human user, of the differences between the first and second version of the dataset based on the internal log, the human-readable log including information on differences between individual blocks of the first version and the second version of the dataset in association with the full path names of the individual data containers which contain the individual data blocks.

14. A method as recited in claim 13, wherein said recording information about the differences in the internal log comprises:

recording differences in the metadata, between the information units of the first and second version of the dataset in the internal log, including recording differences between individual data blocks of the first version of the dataset and the second version of the dataset in the internal log.

15. A method as recited in claim 13, wherein the dataset comprises a file system, and wherein each of the first and second versions of the dataset is a separate snapshot of the file system.

16. A method as recited in claim 13, wherein said examining the first and second version of the dataset to identify ones of the information units which are different between the first and second version of the dataset further comprises:

for each pointer in the first version of the dataset which is different from the corresponding pointer in the second version of the dataset, following the pointer down the hierarchical structure to one of the direct blocks.

17. A method as recited in claim 16, wherein said examining further comprises:

comparing each of the information units in said one of the direct blocks in the first version of the dataset with a corresponding information unit in a corresponding one of the direct blocks in the second version of the dataset; and for each information unit in said one of the direct blocks in the first version of the dataset which is different from the corresponding information unit in the second version, identifying differences in the metadata between the information unit of said one of the direct blocks in the first version of the dataset and the corresponding information unit in the second version.

18. A method as recited in claim 17, wherein said recording information about the differences in the internal log comprises:

recording the differences in the metadata in an internal log file, including recording differences between individual data blocks of the first version of the dataset and the second version of the dataset in the internal log.

19. A method of identifying differences between a first dataset and a second dataset in a network storage server, the first data set being represented by a first metadata tree structure and the second data set being represented by a second metadata tree structure, the method comprising:

during a first processing phase for identifying differences between the first and second data sets, walking the first metadata tree structure and the second metadata tree structure in parallel in the network storage server, to identify differences in individual data blocks between the first data set and the second data set, wherein said walking includes, for each of a plurality of pairs of corresponding data blocks, where each pair includes a first data block in the first dataset and a corresponding second data block in the second dataset, determining that the first data block is identical to the second data block if a pointer in the first metadata tree structure is identical to a pointer in the second metadata tree structure, determining that the first data block is different from the second data block if the pointer in the first metadata tree structure is different from the pointer in the second metadata tree structure, and creating a log of the identified differences in individual data blocks;

during a second processing phase for determining pathnames, after the first processing phase, walking the first metadata tree structure and the second metadata tree structure in the network storage controller to identify full pathnames of individual data containers in the first and second dataset for which differences in individual data blocks between the first and second dataset were identified during said walking, each of the full pathnames including a filename and a directory name; and generating a report for output to a human user, of the differences between the first and second datasets based on the log, the report indicating differences in individual data blocks between the first and second datasets in association with the full pathnames of the individual data containers which contain the individual data blocks.

20. A method of identifying differences between a first dataset and a second dataset in a network storage server, the first data set being represented by a first metadata tree structure and the second data set being represented by a second metadata tree structure, the method comprising:

during a first processing phase for identifying differences between the first and second data sets, walking the first metadata tree structure and the second metadata tree structure in parallel by using a processor in the network storage server, to identify differences in individual data blocks between the first data set and the second data set, wherein said walking includes, for each of a plurality of pairs of corresponding data blocks, where each pair includes a first data block in the first dataset and a corresponding second data block in the second dataset, determining that the first data block is identical to the second data block if a pointer in the first metadata tree structure is identical to a pointer in the second metadata tree structure, if the pointer in the first metadata tree structure is different from the pointer in the second metadata tree structure, then performing a byte-by-byte comparison of corresponding bytes in the first data block and the second data block, and determining that the second data block is identical to the first data block if the byte-by-byte comparison detects no differences between said corresponding bytes;

if the byte-by-byte comparison detects one or more differences, then performing a field-by-field comparison of corresponding fields in the first data block and the second data block, and then creating a log of identified differences in individual data blocks based on the field-by-field comparison;

during a second processing phase for determining pathnames, after the first processing phase, walking the first metadata tree structure and the second metadata tree structure by using the processor in the network storage server, to identify full pathnames of individual data containers in the first and second dataset for which differences in individual data blocks between the first and second dataset were identified during said walking, each of the full pathnames including a filename and a directory name; and generating a report for output to a human user, of the differences between the first and second datasets based on the log, by using the processor in the network storage server, the report indicating differences in individual data blocks between the first and second datasets in association with the full pathnames of the individual data containers which contain the individual data blocks.

* * * * *